US012166314B2

(12) United States Patent
Chang et al.

(10) Patent No.: US 12,166,314 B2
(45) Date of Patent: Dec. 10, 2024

(54) BATTERY CONNECTOR IN AN INFORMATION HANDLING SYSTEM

(71) Applicant: Dell Products L.P., Round Rock, TX (US)

(72) Inventors: Chia-Fa Chang, Linkou Township (TW); Chia-Liang Lin, Taipei (TW); Shao-Szu Ho, New Taipei (TW); Chien-Hao Chiu, Bade District (TW); Hui-Huan Chien, Taipei (TW)

(73) Assignee: Dell Products L.P., Round Rock, TX (US)

( * ) Notice: Subject to any disclaimer, the term of this patent is extended or adjusted under 35 U.S.C. 154(b) by 684 days.

(21) Appl. No.: 17/386,066

(22) Filed: Jul. 27, 2021

(65) Prior Publication Data

US 2023/0029463 A1 Feb. 2, 2023

(51) Int. Cl.
*H01R 13/631* (2006.01)
*H01M 50/528* (2021.01)
*H01R 12/72* (2011.01)

(52) U.S. Cl.
CPC ...... *H01R 13/6315* (2013.01); *H01M 50/528* (2021.01); *H01R 12/722* (2013.01)

(58) Field of Classification Search
CPC ............. H01R 13/6315; H01R 13/71; H01R 12/722; H01R 12/88; H01R 12/99; H01M 50/528; H01M 50/502; H01M 2010/4278
USPC ................................................. 439/346, 299
See application file for complete search history.

(56) References Cited

U.S. PATENT DOCUMENTS

| | | | | |
|---|---|---|---|---|
| 6,780,044 B1* | 8/2004 | Sawyer | ................. | H01R 4/2433 439/417 |
| 7,515,438 B2* | 4/2009 | Lippert | ................. | G06F 1/1698 361/814 |
| 7,626,814 B2* | 12/2009 | Seibert | ................. | G06F 1/1635 361/679.41 |
| 8,262,405 B1* | 9/2012 | Bishop | ............... | H01R 4/48455 439/439 |
| 8,568,157 B2* | 10/2013 | Bishop | ................. | H01R 4/2433 439/389 |
| 8,608,504 B2* | 12/2013 | Tseng | ................. | H01R 13/6471 439/497 |
| 8,851,919 B2* | 10/2014 | Schutz | ................. | H01R 4/2433 439/405 |

(Continued)

FOREIGN PATENT DOCUMENTS

CN 108123304 A * 6/2018

*Primary Examiner* — Marcus E Harcum
(74) *Attorney, Agent, or Firm* — Larson Newman, LLP

(57) ABSTRACT

A connector in an information handling system includes a battery connector, a battery receptacle, and a signal pin structure contact. The battery connector includes a first set of power pins and a first set of signal pins. The battery receptacle includes a second set of power pins and a second set of signal pins. The first and second sets of power pins are coupled together when the battery connector is inserted within the battery receptacle. The signal pin structure contact transitions between an open position and a closed position. The signal pin structure contact couples the first and second sets of signal pins when the signal pin structure contact is in the closed position. A power down signal is provided to components of the information handling system when the signal pin structure contact is in the open position.

19 Claims, 16 Drawing Sheets

(56) References Cited

U.S. PATENT DOCUMENTS

| | | | | |
|---|---|---|---|---|
| 8,936,487 | B2* | 1/2015 | Takane | H01R 12/79 |
| | | | | 439/626 |
| 9,098,254 | B2* | 8/2015 | Utz | G06F 1/1658 |
| 10,003,135 | B1* | 6/2018 | Strong | H01R 3/00 |
| 2002/0145340 | A1* | 10/2002 | Hirai | H01M 50/574 |
| | | | | 307/326 |
| 2003/0216073 | A1* | 11/2003 | Yeh | H01R 13/2442 |
| | | | | 439/188 |
| 2007/0254520 | A1* | 11/2007 | Niggemann | H01R 9/2491 |
| | | | | 439/395 |
| 2010/0323237 | A1 | 12/2010 | Huang et al. | |
| 2011/0148223 | A1* | 6/2011 | McCoy | H01R 13/71 |
| | | | | 307/116 |
| 2014/0080339 | A1* | 3/2014 | Ebisawa | H01R 13/514 |
| | | | | 439/212 |
| 2016/0139641 | A1 | 5/2016 | Hijazi et al. | |
| 2017/0237211 | A1* | 8/2017 | Read | H01R 13/748 |
| | | | | 439/571 |
| 2019/0379162 | A1* | 12/2019 | Motoshige | H01H 9/104 |
| 2020/0235540 | A1* | 7/2020 | Justin | H01R 33/7685 |
| 2022/0059955 | A1* | 2/2022 | Endo | H01R 12/7023 |
| 2022/0278488 | A1* | 9/2022 | Miyamura | H01R 13/639 |
| 2022/0344846 | A1* | 10/2022 | Kitagawa | H01R 12/89 |

* cited by examiner

502

602

BATTERY CONNECTOR IN AN INFORMATION HANDLING SYSTEM

FIELD OF THE DISCLOSURE

The present disclosure generally relates to a battery connector in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A connector in an information handling system includes a battery connector, a battery receptacle, and a signal pin structure contact. The battery connector includes a first set of power pins and a first set of signal pins. The signal pins include a system management bus clock (CLK_SMB) pin, a system management bus data (DAT_SMB) pin, a battery present (BATT_PRES) pin, and a system present (SYS_PRES) pin. The battery receptacle includes a second set of power pins and a second set of signal pins. The first and second sets of power pins may be coupled together when the battery connector is inserted within the battery receptacle. The signal pin structure contact may transition between an open position and a closed position. The signal pin structure contact may couple the first and second sets of signal pins when the signal pin structure contact is in the closed position. A power down signal may be provided to components of the information handling system when the signal pin structure contact is in the open position.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
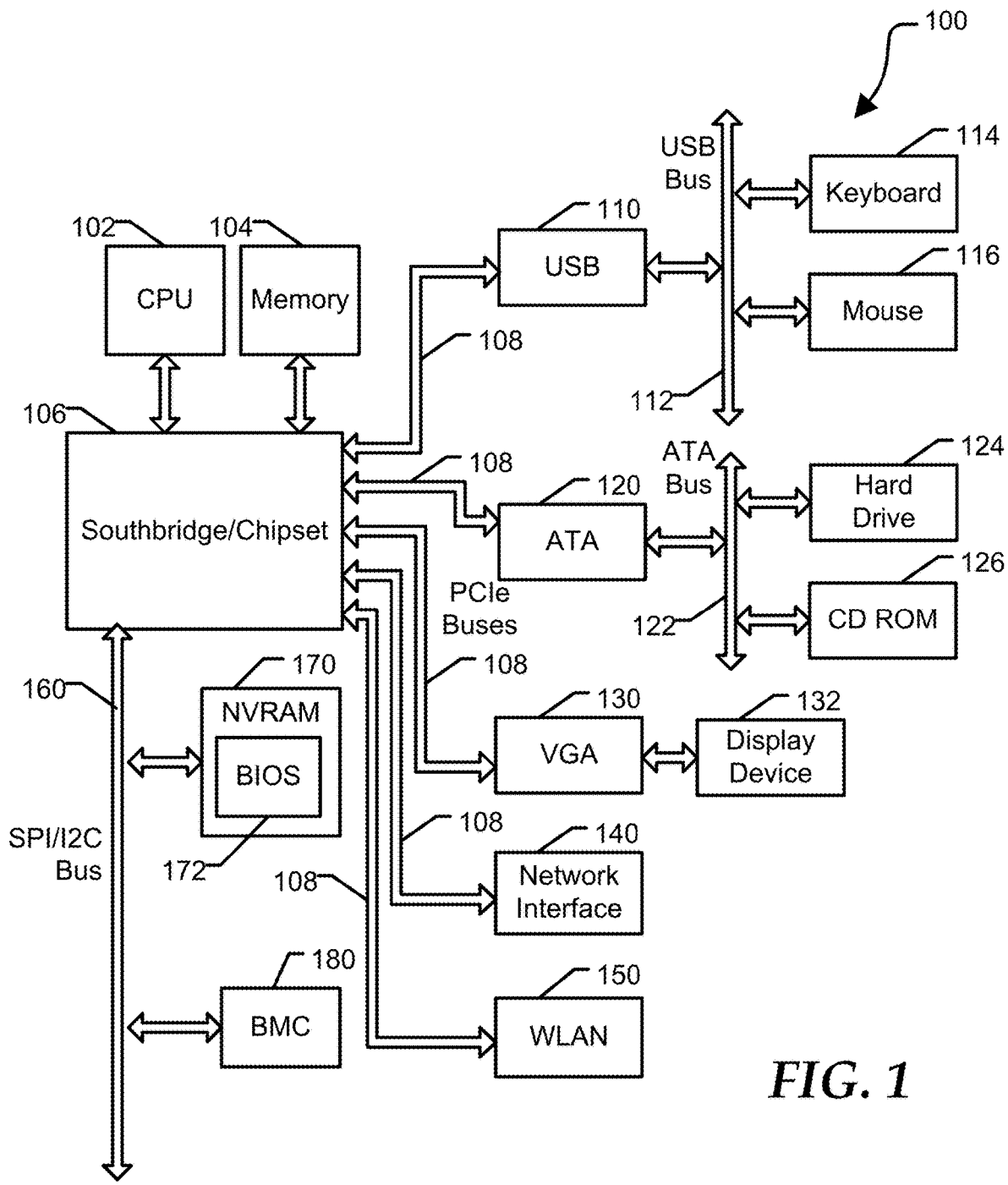
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
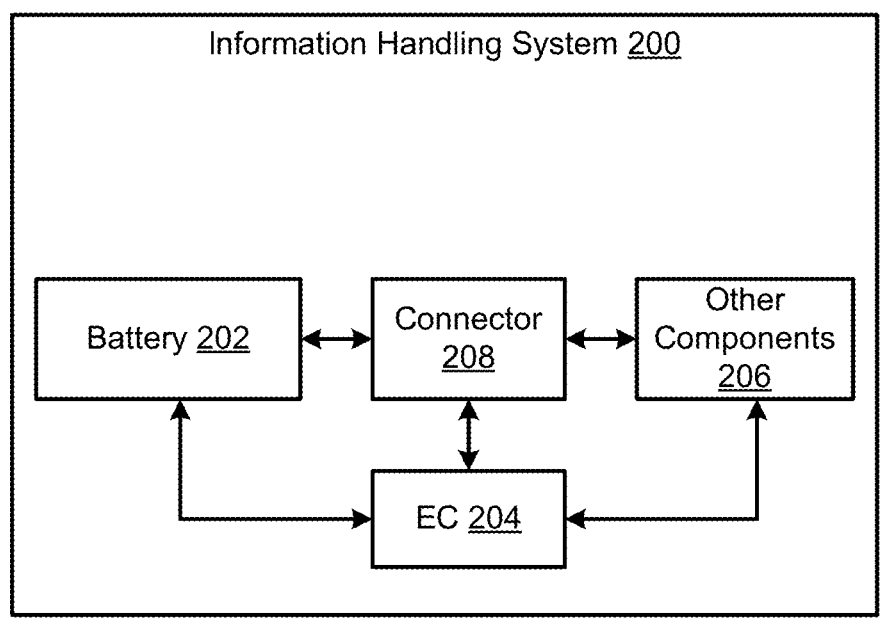
FIG. 2 is a diagram of a portion of an information handling system according to at least one embodiment of the present disclosure.

In an example, information handling system 100 may be any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

FIG. 2 illustrates a portion of an information handling system 200 according to at least one embodiment of the present disclosure. Information handling system 200 may be substantially similar to information handling system 100 of FIG. 1. Information handling system 200 includes a battery 202, an embedded controller 204, other components 206, and a connector 208. In an example, connector 208 may include any suitable components to provide power from battery 202 to other components 206, and to communicate a signal pin structure contacts state to embedded controller 204. For example, connector 208 may include signal pins, power pins, a battery connector, and a battery receptacle as will be described in detail with respect to FIGS. 3-16. In an example, the signal pins may include a system management bus clock (CLK_SMB) pin, a system management bus data (DAT_SMB) pin, a battery present (BATT_PRES) pin, and a system present (SYS_PRES) pin. In certain examples, information handling system 200 may include additional components over those shown in FIG. 2 without varying from the scope of this disclosure.

In an example, a battery connector of connector 208 may be inserted into a battery receptacle of the connector. In certain examples, the batter connector and the battery receptacle may connect and the signal pin structure may close in any suitable manner. For example, the batter connector and battery receptacle may connect and the signal pin structure may close in a horizontal insert and a vertical signal pin insert, in a vertical insert and a vertical signal pin insert, in a horizontal insert and a horizontal signal pin insert, and in a vertical insert and a horizontal signal pin insert.

Embedded controller 204 may perform one or more suitable operations to determine whether battery 202 may provide power to other components 206. For example, embedded controller 204 may monitor signal pin structure contacts within connector 208 to determine whether a battery connector is coupled to a battery receptacle in the connector. In certain examples, the signal pin structure may provide any suitable data communication on any suitable number of pins including, but not limited to, a system management bus clock (CLK_SMB) pin, a system management bus data (DAT_SMB) pin, a battery present (BATT_PRES) pin, and a system present (SYS_PRES) pin. Battery present pin may be tied to ground on battery 202 side of connector 208, and system present pin may be tied to ground on other components 206 side of the connector.

In an example, embedded controller 204 may monitor any suitable pin in the signal pin structure to determine whether the signal pin structure contacts are open or closed. For example, embedded controller 204 may monitor any or all of the system management bus clock (CLK_SMB) pin, system management bus data (DAT_SMB) pin, battery present (BATT_PRES) pin, system present (SYS_PRES) pin, or the like. When the signal pin structure contacts are closed, embedded controller 204 may detect data being transmitted on the system management bus clock (CLK_SMB) pin and/or the system management bus data (DAT_SMB) pin. When the signal pin structure contacts are open, embedded controller 204 may not detect data being transmitted on the system management bus clock (CLK_SMB) pin and/or the system management bus data (DAT_SMB) pin. In certain examples, embedded controller 204 may monitor the battery present (BATT_PRES) pin and the system present (SYS_PRES) pin on either side of connector 208, such as battery 202 side or other components 206 side. When the signal pin structure contacts are closed, embedded controller 204 may detect a same value, such as a digital high or a digital low, on both the battery present (BATT_PRES) pin and the system present (SYS_PRES) pin. When the signal pin structure contacts are open, embedded controller 204 may detect different values, such as a digital high and a digital low, on the battery present (BATT_PRES) pin and the system present (SYS_PRES) pin.

In response to embedded controller 204 detecting the signal pin structure contacts are closed, the embedded controller may provide a battery present signal to other components 206, and provide a system present signal to battery 202. Based on the battery present signal and the system present signal, battery 202 may turn on a power MOSFET so that other components 206 may receive power from the battery.

In an example, embedded controller 204 may determine whether the signal pin structure contacts are open. In response to the signal pin structure contacts being open, embedded controller 204 may provide a battery disconnected signal to other components 206, and a system disconnected signal to battery 202. In response to the battery disconnect signal, other components 206 may power down before power is lost from battery 202. In response to the system disconnected signal, battery 202 may turn off a power MOSFET to prevent power from being provided to other components 206, enter into a no function operations, and perform a full disconnect the other components, such as a motherboard of information handling system 200.

Figure 3:
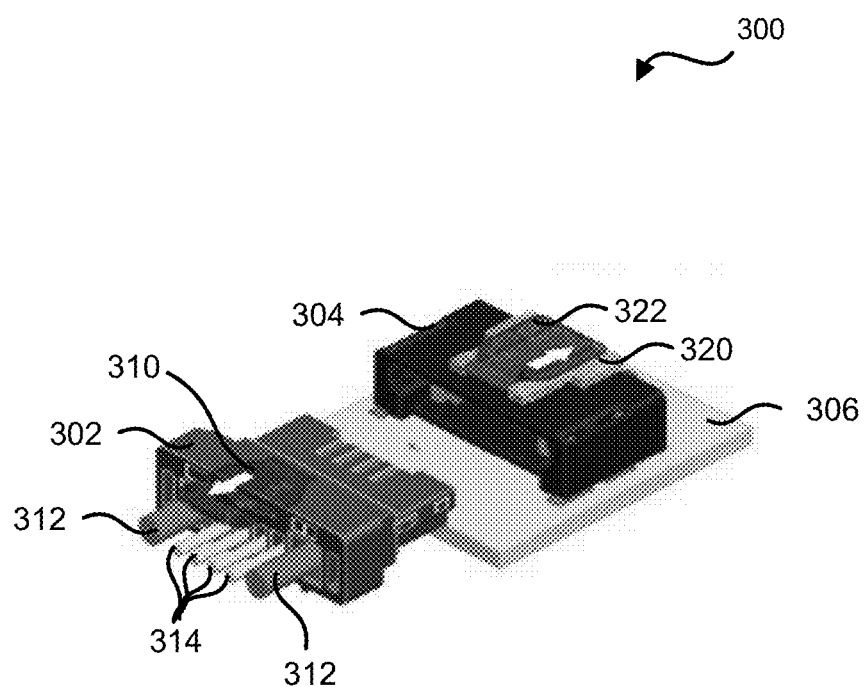
FIG. 3 is a diagram of a battery connector and a battery receptacle having a horizontal insert and a vertical signal pin insert according to at least one embodiment of the present disclosure.

FIG. 3 illustrates a connector 300 including a battery connector 302, a battery receptacle 304, and a printed circuit board assembly (PCBA) 306 according to at least one embodiment of the present disclosure. Battery connector 302 includes a pull tab 310, power pins 312, and signal pins 314. Battery receptacle 304 includes signal pin structure contact cover 320 and a pull tab 322. In certain examples, power pins 312 may provide different power ratings. Signal pins 314 may be any suitable communication pins, such as a system management bus clock pin, a system management bus data pin, a battery present pin, and a system present pin. In an example, power from power pins 312 may be provide to components, such as other components 206 of FIG. 2, via battery receptacle 304 and PCBA 306. Connector 300 may be in a horizontal insert and a vertical signal pin insert structure. For example, battery connector 302 may be inserted within battery receptacle 304 in a horizontal direction and signal pin structure contacts may open and close in a vertical direction.

Figure 4:
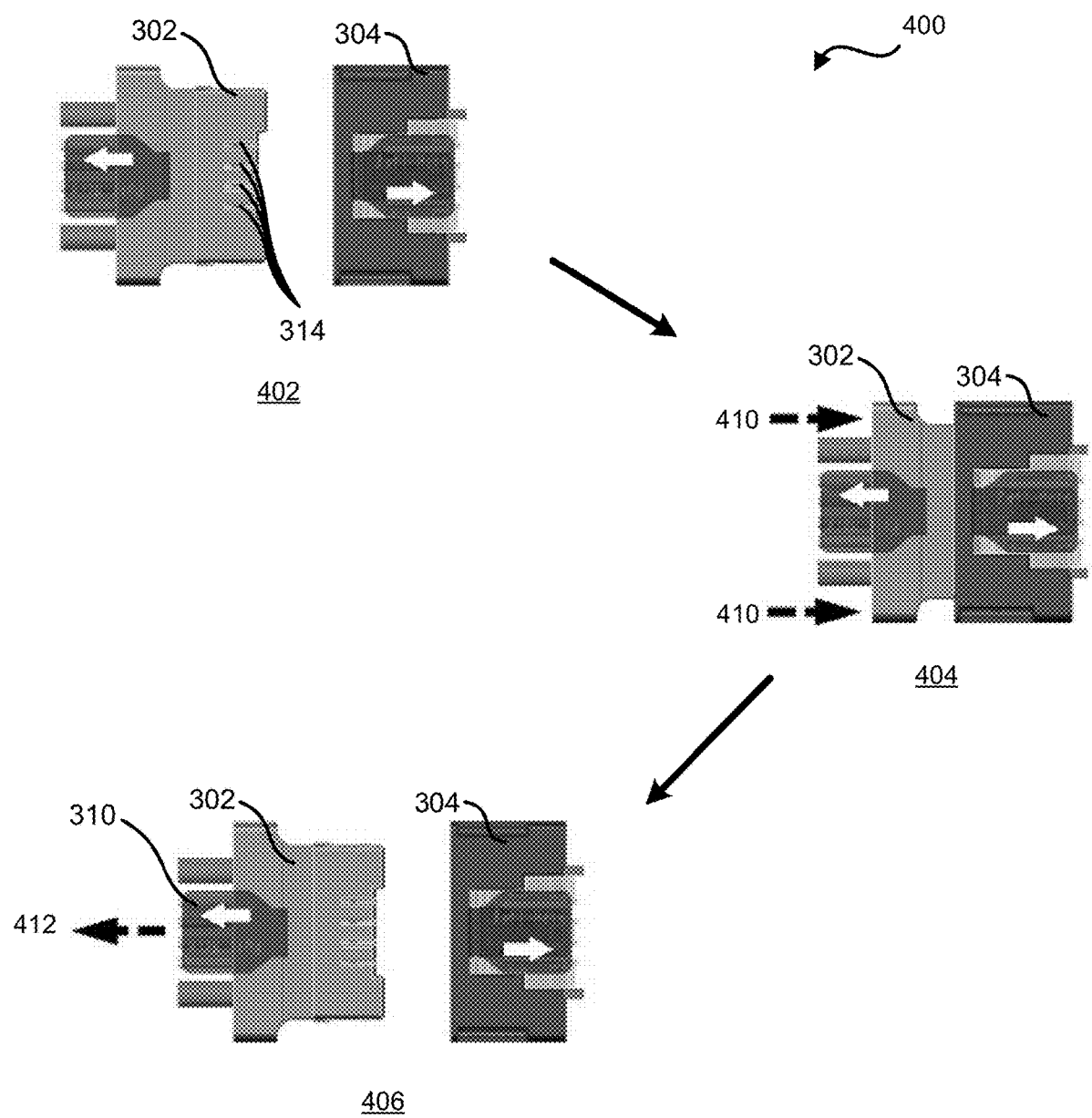
FIG. 4 is a diagram showing a sequence of steps to connect the battery connector and the battery receptacle according to at least one embodiment of the present disclosure.

FIG. 4 illustrates a sequence 400 of steps 402, 404, and 406 to connect battery connector 302 and battery receptacle 304 according to at least one embodiment of the present disclosure. At step 402, battery connector 302 may be aligned with battery receptacle 304. In an example, signal pins 314 of battery connector 302 may be aligned with corresponding signal pins inside battery receptacle 304. At step 404, battery connector 302 may be pushed in the direction of arrows 410, and the force may cause the battery connector to be inserted within battery receptacle 304. At step 406, battery connector 302 may be pulled, via pull tab 310 in the direction of arrow 412, and the force may cause the battery connector to be removed from battery receptacle 304.

Figure 5:
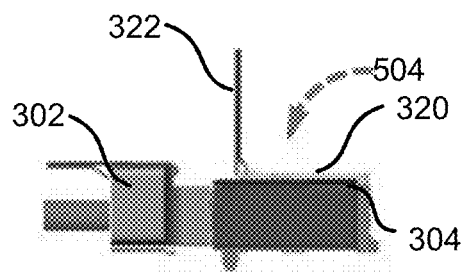
FIG. 5 is a diagram of the battery connector and the battery receptacle with a signal structure closed according to at least one embodiment of the present disclosure.

FIG. 5 illustrates a closed state 502 of signal pin structure contacts of battery receptacle 304 while battery connector 302 is inserted within the battery receptacle according to at least one embodiment of the present disclosure. In an example, pull tab 322 of battery receptacle 304 may be in a substantially vertical position and a force may be exerted on signal pin structure contact cover 320 in the direction of arrow 504. In this example, signal pin structure contact cover 320 may be pushed substantially downward to close the signal pin structure contacts.

Figure 6:
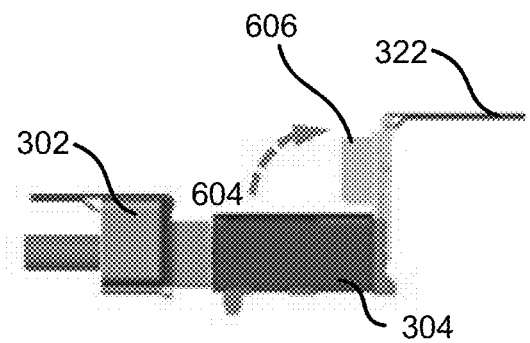
FIG. 6 is a diagram of the battery connector and the battery receptacle with the signal structure open according to at least one embodiment of the present disclosure.

FIG. 6 illustrates an open state 602 of signal pin structure contacts 606 of battery receptacle 304 while battery connector 302 is inserted within the battery receptacle according to at least one embodiment of the present disclosure. In an example, a force may be exerted on pull tab 322 in the direction of arrow 604. In response to the force, signal pin structure contacts 606 may be pulled out of battery receptacle 304 in a substantially vertical direction.

Figure 7:
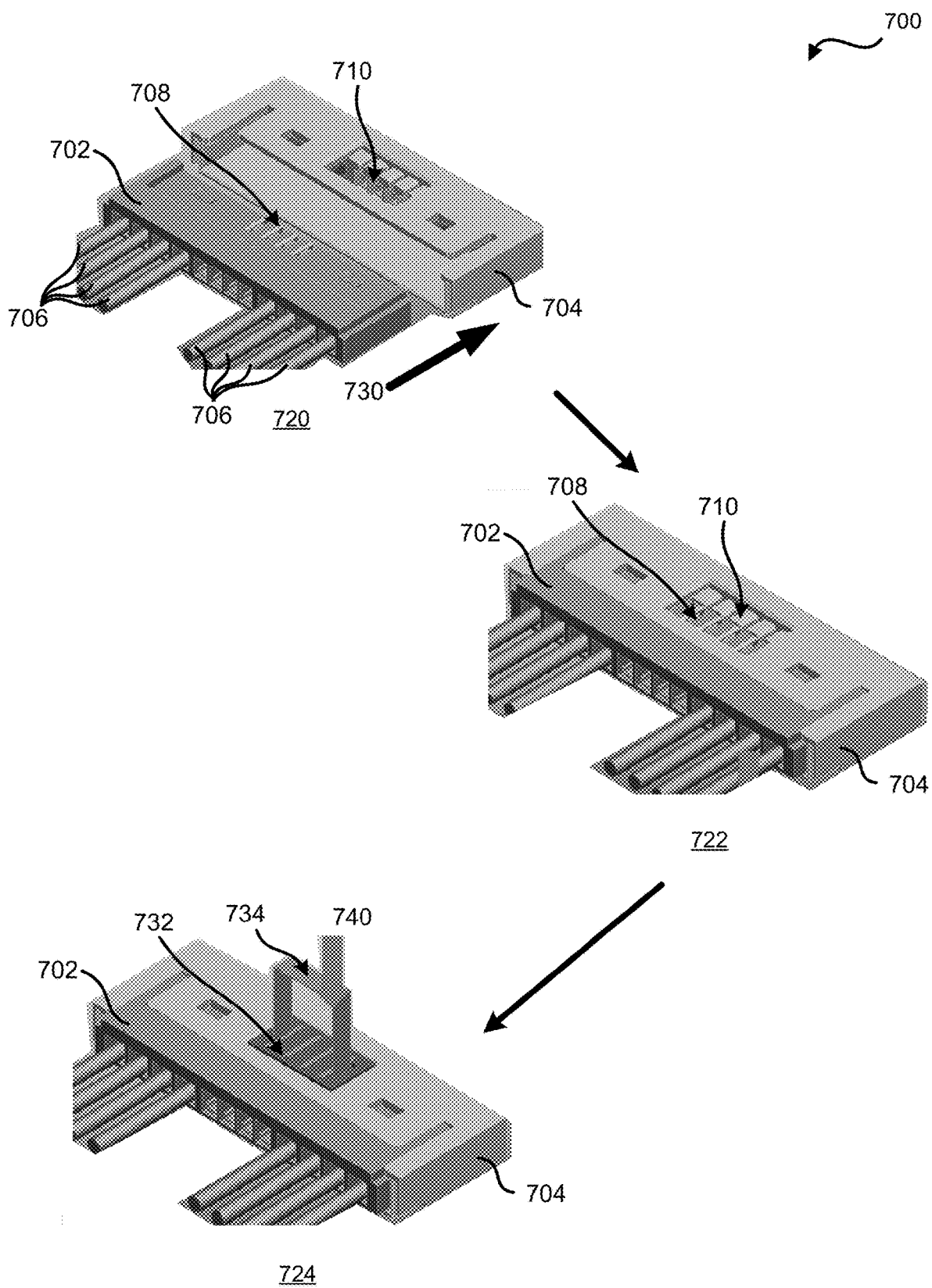
FIG. 7 is a diagram showing a sequence of steps to connect a battery connector and a battery receptacle having a horizontal insert and a vertical signal pin insert according to at least one embodiment of the present disclosure.

FIG. 7 illustrates a sequence 700 of steps 720, 724, and 726 to connect a battery connector 702 and a battery receptacle 704 according to at least one embodiment of the present disclosure. Battery connector 702 includes power pins 706 and signal pins 708. Battery receptacle 704 includes signal pins 710. In certain examples, power pins 706 may provide different power ratings. Signal pins 708 and 710 may be any suitable communication pins, such as a system management bus clock pin, a system management bus data pin, a battery present pin, and a system present pin. In an example, power from power pins 706 may be provide to components, such as other components 206 of FIG. 2, via battery receptacle 704. In an example, battery connector 702 may be inserted within battery receptacle 704 in a horizontal direction and signal pin structure contacts 734 may open and close in a vertical direction.

At step 720, battery connector 702 may be aligned with battery receptacle 704. In an example, signal pins 708 of battery connector 702 may be aligned with corresponding signal pins 710 inside battery receptacle 704. In response to battery connector 702 being aligned with battery receptacle 704, the battery connector may be pushed in the direction of arrow 730, and the force may cause the battery connector to be inserted within battery receptacle 704. At step 722, battery connector 702 may be within battery receptacle 704 so that signal pins 708 and 710 are adjacent to each other. At step 724, a signal pin structure contact cover 732 may be placed on the signal pins of battery connector 702 and the signal pins of battery receptacle 704. A signal pin structure contact 734 may be pushed in the direction of arrow 740 to contact signal pin structure contact cover 732, which in turn may place the signal pin structure contact in a closed position. In an example, signal pin structure contact 734 may move in a substantially vertical direction as indicated by arrow 740.

Figure 8:
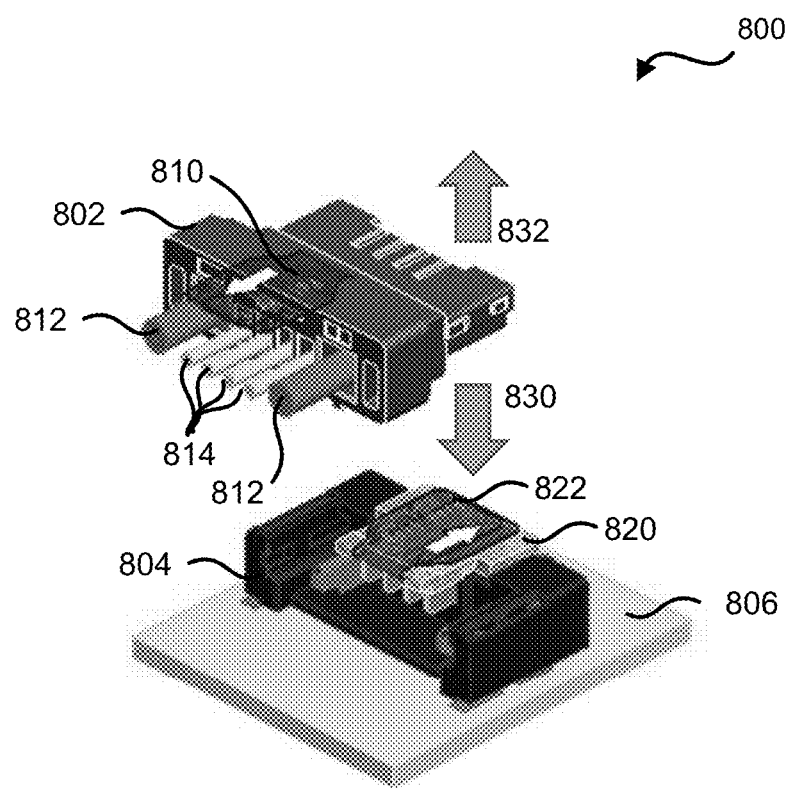
FIG. 8 is a diagram of a battery connector and a battery receptacle with a vertical insert and a vertical signal pin insert according to at least one embodiment of the present disclosure.

FIG. 8 illustrates a connector 800 including a battery connector 802, a battery receptacle 804, and a PCBA 806 according to at least one embodiment of the present disclosure. Battery connector 802 includes a pull tab 810, power pins 812, and signal pins 814. Battery receptacle 804 includes signal pin structure contact cover 820 and a pull tab 822. In certain examples, power pins 812 may provide different power ratings. Signal pins 814 may be any suitable communication pins, such as a system management bus clock pin, a system management bus data pin, a battery present pin, and a system present pin. In an example, power from power pins 812 may be provide to components, such as other components 206 of FIG. 2, via battery receptacle 804 and PCBA 806. Connector 800 may be in a vertical insert and a vertical signal pin insert structure. For example, battery connector 802 may be inserted within and removed from battery receptacle 802 in a vertical direction as indicated by arrows 830 and 832. Similarly, signal pin structure contacts may open and close in a vertical direction.

Figure 9:
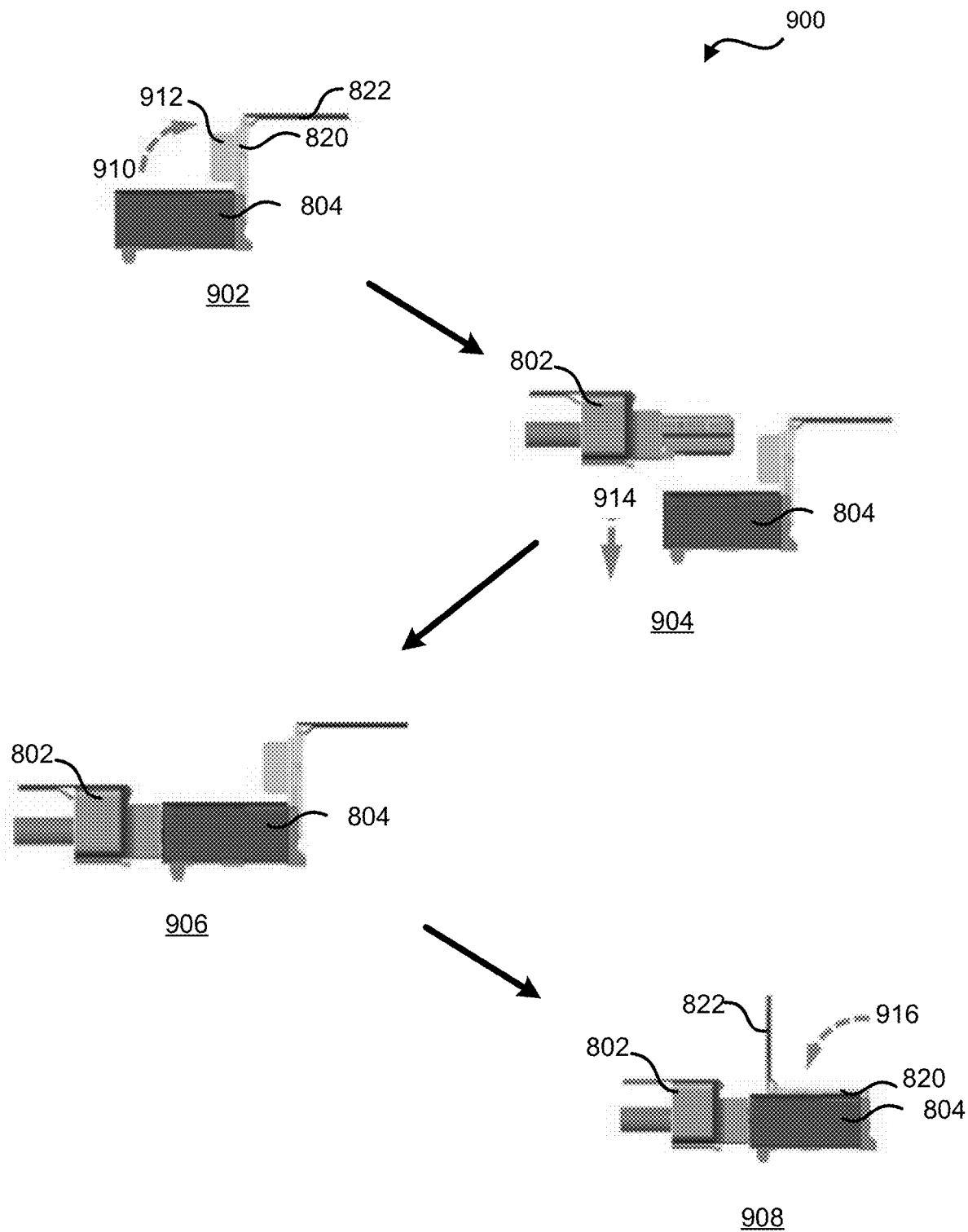
FIG. 9 is a diagram showing a sequence of steps to connect the battery connector and the battery receptacle having the vertical insert and the vertical signal pin insert according to at least one embodiment of the present disclosure.

FIG. 9 illustrates a sequence 900 of steps 902, 904, 906, and 908 to connect battery connector 802 and battery receptacle 804 according to at least one embodiment of the present disclosure. At step 902, a force may be exerted on pull tab 822 in the direction of arrow 912. In response to the force, signal pin structure contact cover 820 may be pulled up and signal pin structure contacts 912 may be pulled out of battery receptacle 804 in a substantially vertical direction.

At step 904, battery connector 802 may be aligned above battery receptacle 804, and the battery connector may be pushed in the direction of arrow 920. In an example, the force may cause battery connector 802 to be inserted within battery receptacle 804 as shown at step 906. At step 908, signal pin structure contact cover 820 may be pushed in the direction of arrow 916, which in turn may push signal pin structure contacts 912 within battery receptacle 804. In response to signal pin structure contacts 912 being pushed within battery receptacle 804, the signal pin structure contacts may be in a closed position.

Figure 10:
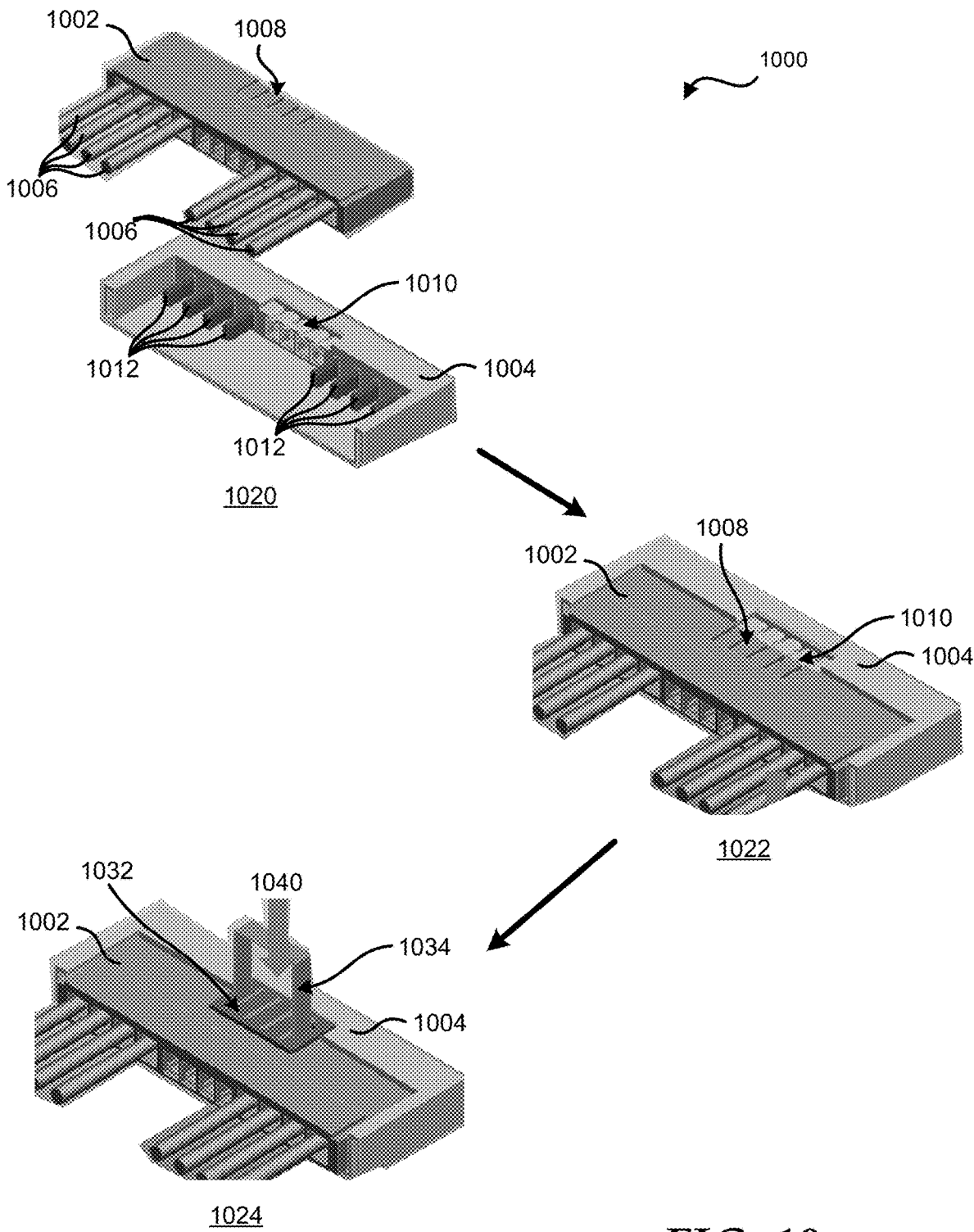
FIG. 10 is a diagram showing a sequence of steps to connect a battery connector and a battery receptacle having a vertical insert and a vertical signal pin insert according to at least one embodiment of the present disclosure.

FIG. 10 illustrates a sequence 1000 of steps 1020, 1022, and 1024 to connect a battery connector 1002 and a battery receptacle 1004 according to at least one embodiment of the present disclosure. Battery connector 1002 includes power pins 1006 and signal pins 1008. Battery receptacle 1004 includes signal pins 1010 and power pins 1012. In certain examples, power pins 1006 may provide different power ratings to power pins 1012 of battery receptacle 1004. Signal pins 1008 and 1010 may be any suitable communication pins, such as a system management bus clock pin, a system management bus data pin, a battery present pin, and a system present pin. In an example, power from power pins 1006 may be provide to components, such as other components 206 of FIG. 2, via power pins 1012 of battery receptacle 1004. In an example, battery connector 1002 may be inserted within battery receptacle 1004 in a vertical direction and signal pin structure contacts 1034 may open and close in a vertical direction.

At step 1020, battery connector 1002 may be aligned above battery receptacle 1004. In an example, signal pins 1008 of battery connector 1002 may be aligned above corresponding signal pins 1010 inside battery receptacle 1004. In response to battery connector 1002 being aligned with battery receptacle 1004, the battery connector may be pushed in downward in a substantially vertical direction, and the force may cause the battery connector to be inserted within battery receptacle 1004. At step 1022, battery connector 1002 may be within battery receptacle 1004 so that signal pins 1008 and 1010 are adjacent to each other. At step 1024, a signal pin structure contact cover 1032 may be placed on the signal pins of battery connector 1002 and the signal pins of battery receptacle 1004. A signal pin structure contact 1034 may be pushed in the direction of arrow 1040 to contact signal pin structure contact cover 1032, which in turn may place the signal pin structure contact in a closed position. In an example, signal pin structure contact 1034 may move in a substantially vertical direction as indicated by arrow 1040.

Figure 11:
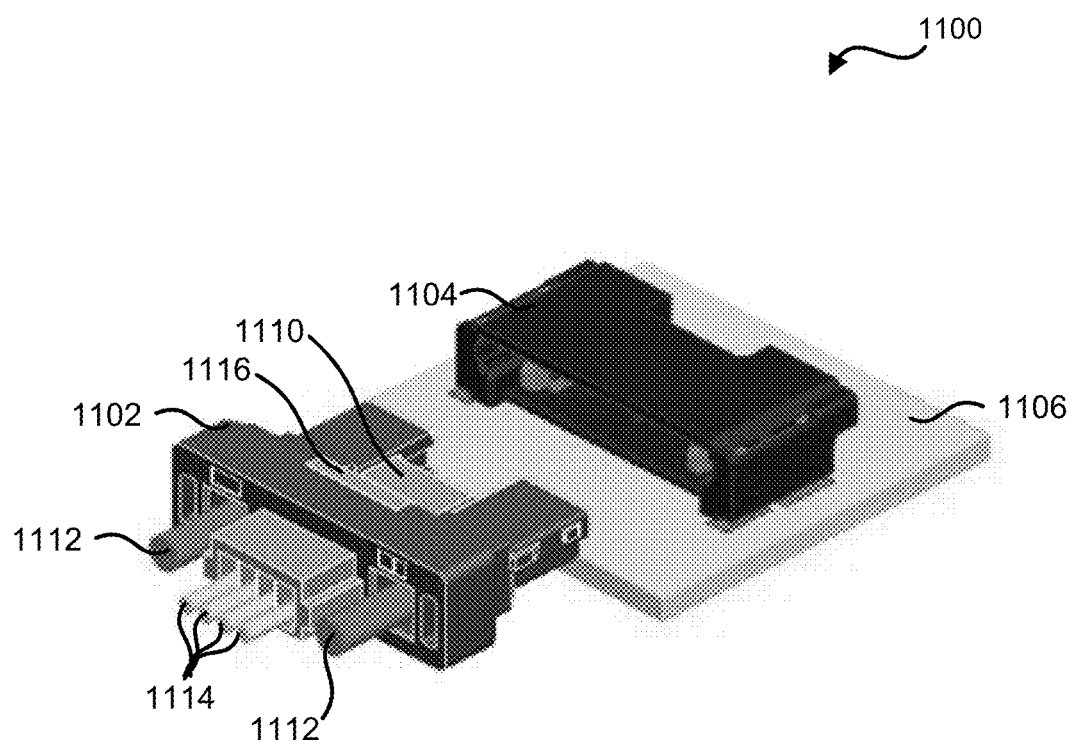
FIG. 11 is a diagram of a battery connector and a battery receptacle having a horizontal insert and a horizontal signal pin insert according to at least one embodiment of the present disclosure.

FIG. 11 a connector 1100 including a battery connector 1102, a battery receptacle 1104, and a PCBA 1106 according to at least one embodiment of the present disclosure. Battery connector 1102 includes a signal pin structure contact 1110, power pins 1112, signal pins 1114, and a tab 1116. In certain examples, power pins 1112 may provide different power ratings. Signal pins 1114 may be any suitable communication pins, such as a system management bus clock pin, a system management bus data pin, a battery present pin, and a system present pin. In an example, power from power pins 1112 may be provide to components, such as other components 206 of FIG. 2, via battery receptacle 1104 and PCBA 1106. Connector 1100 may be in a horizontal insert and a horizontal signal pin insert structure. For example, battery connector 1102 may be inserted within and removed from battery receptacle 1102 in a horizontal direction. Similarly, signal pin structure contacts 1110 may open and close in a horizontal direction.

Figure 12:
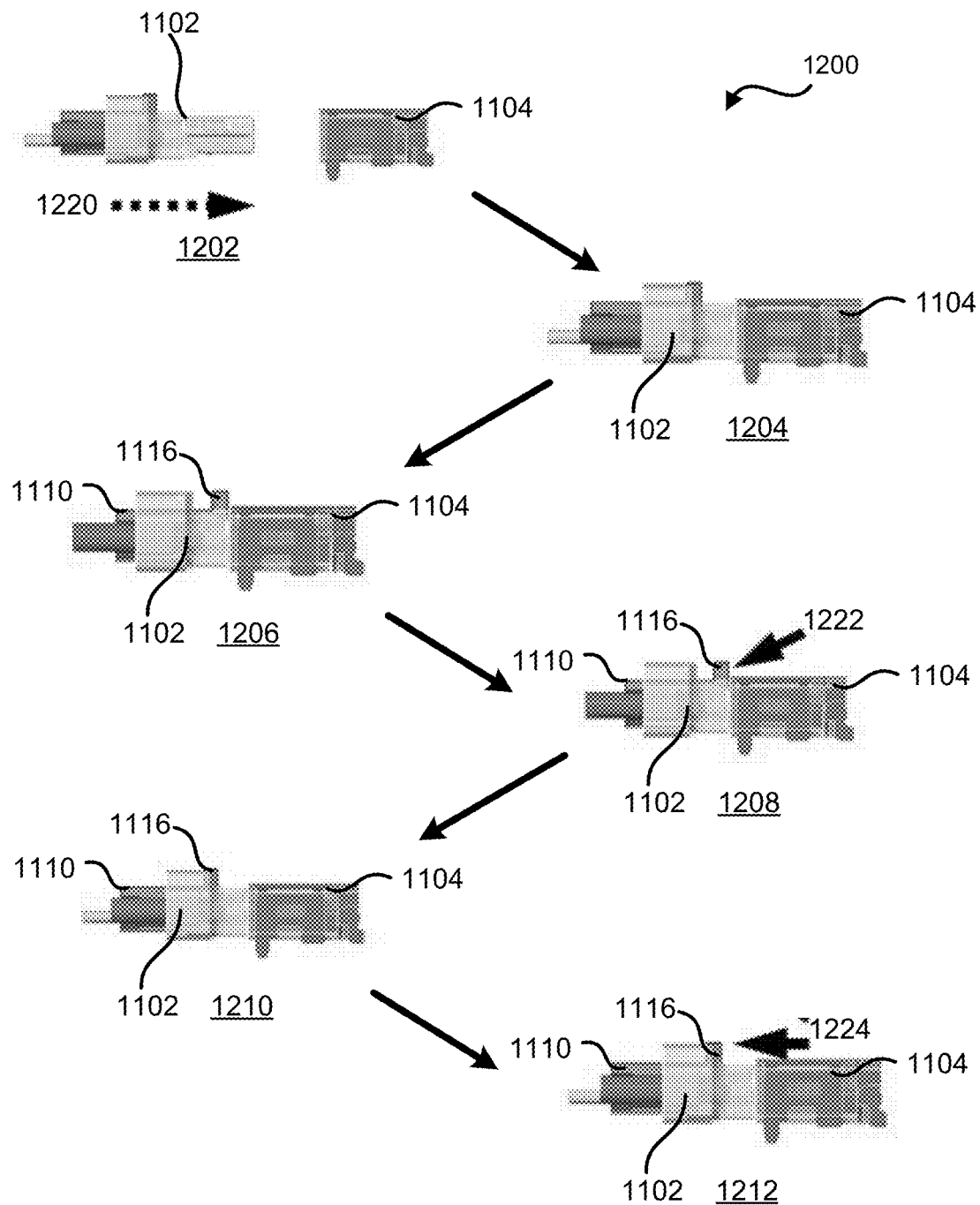
FIG. 12 is a diagram showing a sequence of steps to connect the battery connector and battery receptacle having the horizontal insert and the horizontal signal pin insert according to at least one embodiment of the present disclosure.

FIG. 12 illustrates a sequence 1200 of steps 1202, 1204, 1206, 1208, 1210, and 1212 to connect battery connector 1102 and battery receptacle 1104 according to at least one embodiment of the present disclosure. At step 1202, a force may be exerted battery connector 1102 in the direction of arrow 1220. In response to the force, battery connector 1102 may be inserted within battery receptacle 1104 in a substantially horizontal direction as shown at step 1204.

At step 1206, tab 1116 of battery connector 1102 may be pushed in a substantially horizontal direction. In response to the force pushed against tab 1116, signal pin structure contacts 1110 may be inserted within battery receptacle 1104. In response to signal pin structure contacts 1110 being pushed within battery receptacle 1104, the signal pin structure contacts may be in a closed position.

At step 1208, tab 1116 may be pushed away from battery receptacle 1104 in the direction of arrow 1222. In response to the force being exerted on tab 1116, signal pin structure contacts 1110 may be removed out of battery receptacle 1104 at step 1210. In response to signal pin structure contacts 1110 being pushed out of battery receptacle 1104, the signal pin structure contacts may be in an open position. At step 1212, battery connector 1102 may be pushed in the direction of arrow 1224, which in turn may push the battery connector out of battery receptacle 1104.

Figure 13:
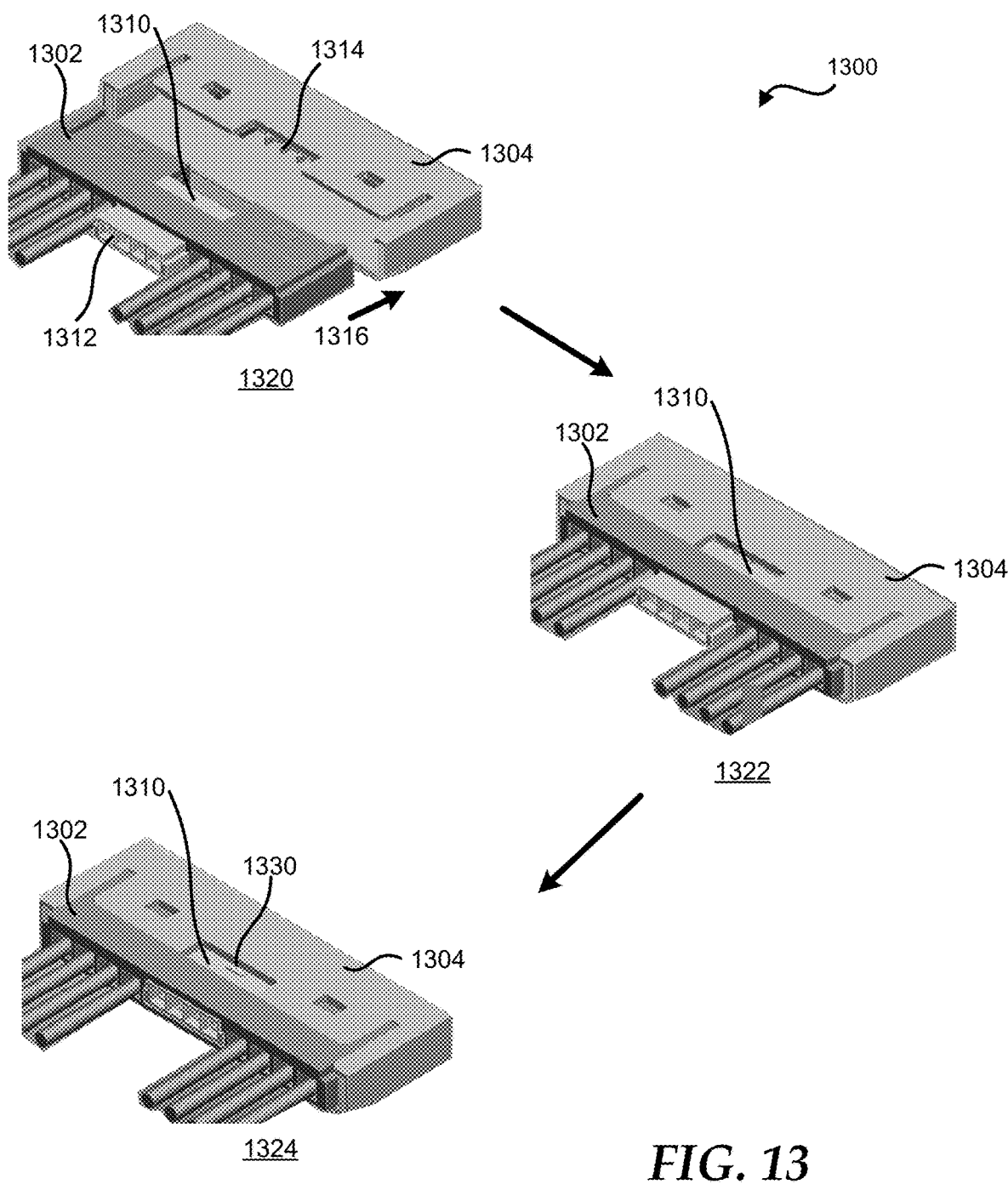
FIG. 13 is a diagram showing a sequence of steps to connect a battery connector and a battery receptacle having a horizontal insert and a horizontal signal pin insert according to at least one embodiment of the present disclosure.

FIG. 13 illustrates a sequence 1300 of steps 1320, 1322, and 1324 to connect a battery connector 1302 and a battery receptacle 1304 according to at least one embodiment of the present disclosure. Battery connector 1302 includes signal pin structure contacts 1310 and signal pins 1312. Battery receptacle 1304 includes signal pins 1314. Signal pins 1312 and 1314 may be any suitable communication pins, such as a system management bus clock pin, a system management bus data pin, a battery present pin, and a system present pin. In an example, battery connector 1302 may be inserted within battery receptacle 1304 in a horizontal direction and signal pin structure contacts 1310 may open and close in a horizontal direction.

At step 1320, battery connector 1302 may be aligned with battery receptacle 1304. In an example, signal pins 1312 of battery connector 1302 may be aligned with corresponding signal pins 1314 inside battery receptacle 1304. In response to battery connector 1302 being aligned with battery receptacle 1304, the battery connector may be pushed in a substantially horizontal direction, and the force may cause the battery connector to be inserted within battery receptacle 1304. At step 1322, battery connector 1302 may be within battery receptacle 1304 so that signal pins 1312 and 1314 are adjacent to each other. At step 1324, tab 1330 of battery connector 1302 may be pushed in a substantially horizontal direction. In response to the force pushed against tab 1330, signal pin structure contacts 1310 may be inserted within battery receptacle 1304. In response to signal pin structure contacts 1310 being pushed within battery receptacle 1310, the signal pin structure contacts may be in a closed position.

Figure 14:
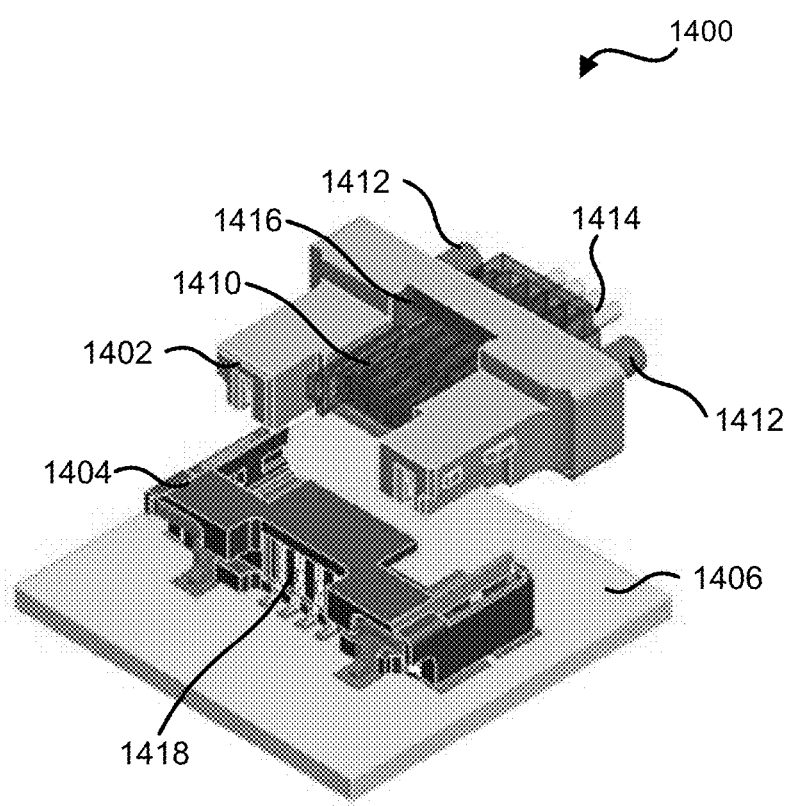
FIG. 14 is a diagram of a battery connector and a battery receptacle having a vertical insert and a horizontal signal pin insert according to at least one embodiment of the present disclosure.

FIG. 14 a connector 1400 including a battery connector 1402, a battery receptacle 1404, and a PCBA 1406 according to at least one embodiment of the present disclosure. Battery connector 1402 includes a signal pin structure contact 1410, power pins 1412, signal pins 1414, and a tab 1416. In certain examples, power pins 1412 may provide different power ratings. Signal pins 1414 and 1418 may be any suitable communication pins, such as a system management bus clock pin, a system management bus data pin, a battery present pin, and a system present pin. In an example, power from power pins 1412 may be provide to components, such as other components 206 of FIG. 2, via battery receptacle 1404 and PCBA 1406. Connector 1400 may be in a vertical insert and a horizontal signal pin insert structure. For example, battery connector 1402 may be inserted within and removed from battery receptacle 1402 in a vertical direction. Signal pin structure contacts 1410 may open and close in a horizontal direction.

Figure 15:
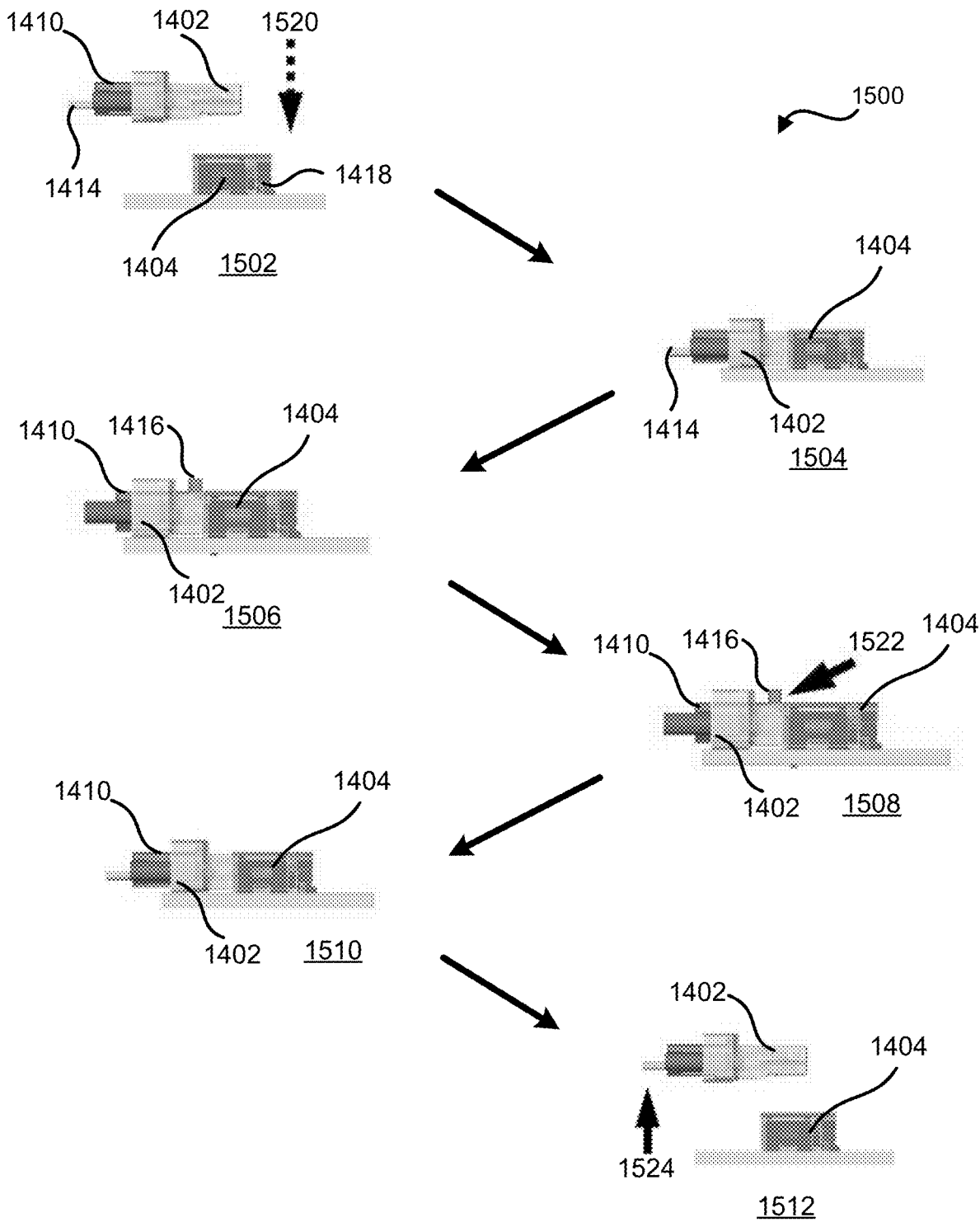
FIG. 15 is a diagram showing a sequence of steps to connect the battery connector and battery receptacle having the vertical insert and the horizontal signal pin insert according to at least one embodiment of the present disclosure.

FIG. 15 illustrates a sequence 1500 of steps 1502, 1504, 1506, 1508, 1510, and 1512 to connect battery connector 1402 and battery receptacle 1404 according to at least one embodiment of the present disclosure. At step 1502, battery connector 1402 may be aligned above battery receptacle 1404, and a force may be exerted battery connector 1402 in the direction of arrow 1520. In response to the force, battery connector 1402 may be inserted within battery receptacle 1404 in a substantially vertical direction as shown at step 1504.

At step 1506, tab 1416 of battery connector 1402 may be pushed in a substantially horizontal direction. In response to the force pushed against tab 1416, signal pin structure contacts 1410 may be inserted within battery receptacle 1404. In response to signal pin structure contacts 1410 being pushed within battery receptacle 1404, the signal pin structure contacts may be in a closed position.

At step 1508, tab 1416 may be pushed away from battery receptacle 1404 in the direction of arrow 1522. In response to the force being exerted on tab 1416, signal pin structure contacts 1410 may be removed out of battery receptacle 1404 at step 1510. In response to signal pin structure contacts 1410 being pushed out of battery receptacle 1404, the signal pin structure contacts may be in an open position. At step 1512, battery connector 1402 may be pushed in the direction of arrow 1524, which in turn may push the battery connector out of battery receptacle 1404 in a substantially vertical direction.

Figure 16:
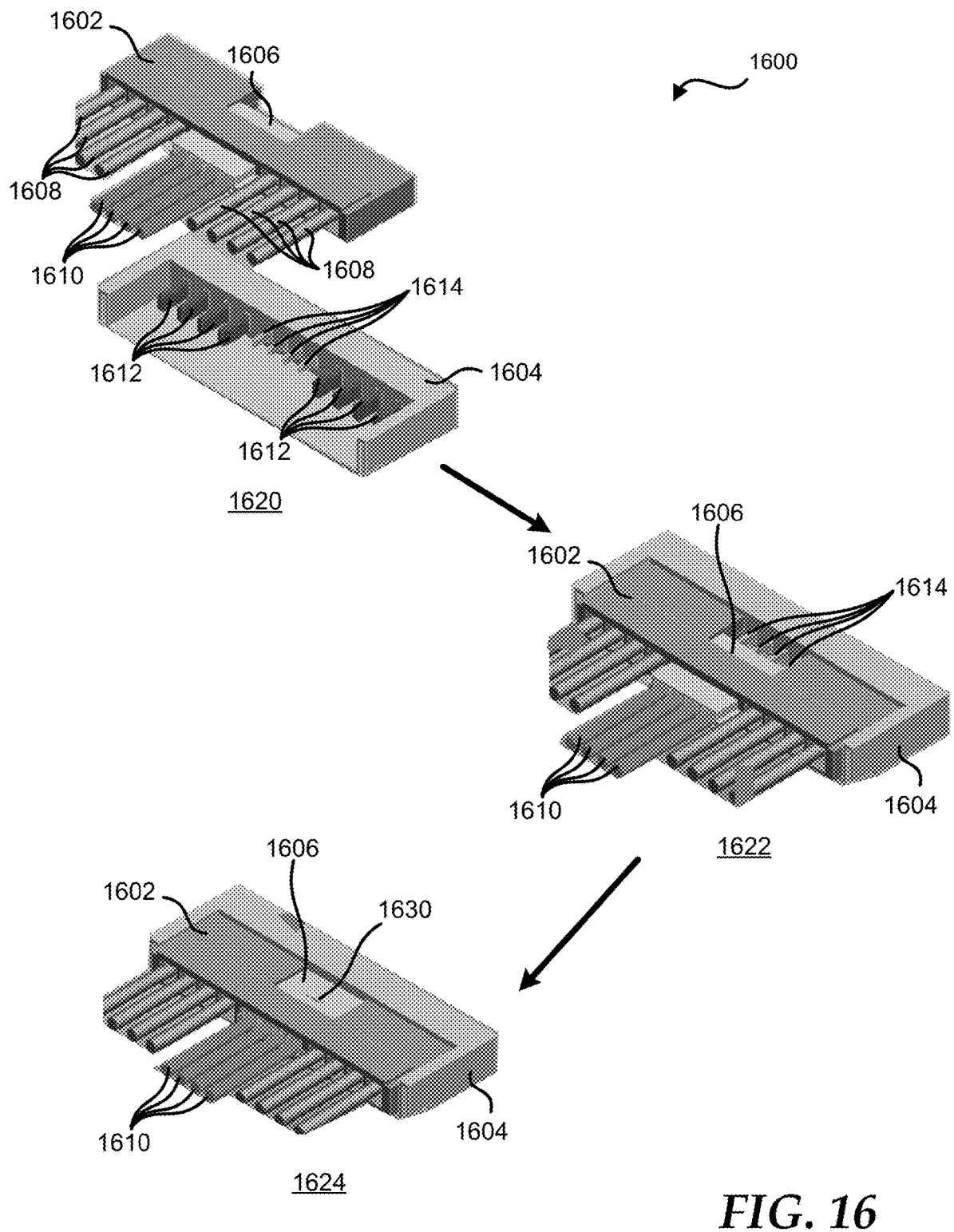
FIG. 16 is a diagram showing a sequence of steps to connect a battery connector and a battery receptacle having a vertical insert and a horizontal signal pin insert according to at least one embodiment of the present disclosure.

FIG. 16 illustrates a sequence 1600 of steps 1620, 1622, and 1624 to connect a battery connector 1602 and a battery receptacle 1604 according to at least one embodiment of the present disclosure. Battery connector 1602 includes signal pin structure contacts 1606, power pins 1608, and signal pins 1610. Battery receptacle 1604 includes power pins 1612 and signal pins 1614. Signal pins 1610 and 1614 may be any suitable communication pins, such as a system management bus clock pin, a system management bus data pin, a battery present pin, and a system present pin. In an example, power from power pins 1608 may be provide to components, such as other components 206 of FIG. 2, via power pins 1612 of battery receptacle 1604. In an example, battery connector 1602 may be inserted within battery receptacle 1604 in a vertical direction and signal pin structure contacts 1606 may open and close in a horizontal direction.

At step 1620, battery connector 1602 may be aligned above battery receptacle 1604. In an example, signal pins 1610 of battery connector 1602 may be aligned with corresponding signal pins 1614 inside battery receptacle 1604. In response to battery connector 1602 being aligned above battery receptacle 1604, the battery connector may be pushed in a substantially downward vertical direction, and the force may cause the battery connector to be inserted within battery receptacle 1604. At step 1622, battery connector 1602 may be within battery receptacle 1604 so that signal pins 1610 and 1614 are adjacent to each other. At step 1624, tab 1630 of battery connector 1602 may be pushed in a substantially horizontal direction. In response to the force pushed against tab 1630, signal pin structure contacts 1606 may be inserted within battery receptacle 1604. In response to signal pin structure contacts 1606 being pushed within battery receptacle 1610, the signal pin structure contacts may be in a closed position.

Figure 17:
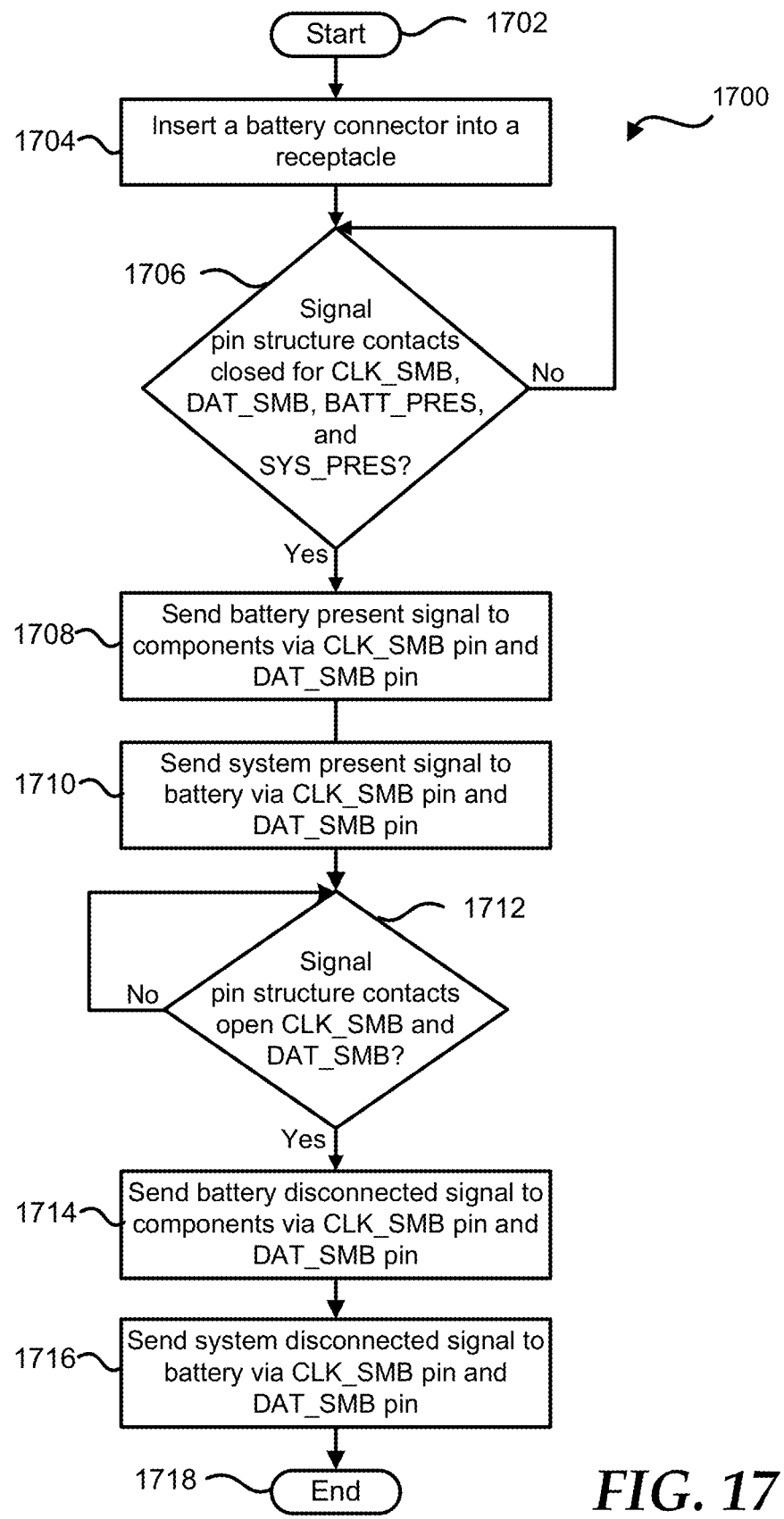
FIG. 17 is a flow diagram of a method for adaptively powering down components of an information handling system prior to disconnecting a battery from the components according to at least one embodiment of the present disclosure.

FIG. 17 illustrates a flow diagram of a method 1700 for adaptively powering down components of an information handling system prior to disconnecting a battery from the components according to at least one embodiment of the present disclosure, starting at block 1702. It will be readily appreciated that not every method step set forth in this flow diagram is always necessary, and that certain steps of the methods may be combined, performed simultaneously, in a different order, or perhaps omitted, without varying from the scope of the disclosure. FIG. 17 may be employed in whole, or in part, by embedded controller 204 of information handling system 200 depicted in FIG. 2, or any other type of system, controller, device, module, processor, or any combination thereof, operable to employ all, or portions of, the method of FIG. 17.

At block 1704, a battery connector is inserted into a battery receptacle. At block 1706, a determination is made whether a signal pin structure is closed. In certain examples, the batter connector and battery receptacle may connect and the signal pin structure may close in any suitable manner. For example, the batter connector and battery receptacle may connect and the signal pin structure may close in a horizontal insert and a vertical signal pin insert, in a vertical insert and a vertical signal pin insert, in a horizontal insert and a horizontal signal pin insert, and in a vertical insert and a horizontal signal pin insert. In an example, the signal pins may include a system management bus clock (CLK_SMB) pin, a system management bus data (DAT_SMB) pin, a battery present (BATT_PRES) pin, and a system present (SYS_PRES) pin.

In response to the signal pin structure contacts being closed, a battery present signal is provided to components of the information handling system at block 1708. In an example, an embedded controller of the information handling system may provide the battery present signal. In certain examples, the battery present signal may be provided via system management bus clock (CLK_SMB) pin, and system management bus data (DAT_SMB) pin. At block 1710, a system present signal is provided to the battery. In an example, the embedded controller of the information handling system may provide the system present signal. In certain examples, the system present signal may be provided via system management bus clock (CLK_SMB) pin, and system management bus data (DAT_SMB) pin.

At block 1712, a determination is made whether the signal pin structure contacts are open. In an example, the embedded controller may communication with the signal pin structure to determine whether the contacts are open or closed. In response to the signal pin structure contacts being open, a battery disconnected signal is provided to the components of the information handling system at block 1714. In an example, the components may power down in response to receiving the battery disconnected signal. In certain examples, the embedded controller may provide the battery disconnected signal. In an example, the battery disconnected signal may be provided via system management bus clock (CLK_SMB) pin, and system management bus data (DAT_SMB) pin. At block 1716, a system disconnected signal is provided to the battery, and the flow ends at block 1718. In an example, the embedded controller may provide the system disconnected signal. In certain examples, the system disconnected signal may be provided via system management bus clock (CLK_SMB) pin, and system management bus data (DAT_SMB) pin.

While the computer-readable medium 136 of information handling system 100 is shown in FIG. 1 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A connector in an information handling system, the connector comprising:
   a battery connector including a first plurality of power pins and a first plurality of signal pins;
   a battery receptacle including a second plurality of power pins and a second plurality of signal pins, the first and second power pins coupled together when the battery connector is inserted within the battery receptacle; and
   a signal pin structure contact to transition between an open position and a closed position, the signal pin structure contact to, when the battery connector is inserted within the battery receptacle, decouple the first and second signal pins when the signal pin structure contact is in the open position and couple the first and second signal pins when the signal pin structure contact is in the closed position, wherein a power down signal is provided to components of the information handling system when the signal pin structure contact is in the open position.

2. The connector of claim 1, further comprising:
   a signal pin structure contact cover in physical communication with and located between the signal pin structure contact and the first and second signal pins.

3. The connector of claim 1, wherein the battery connector is inserted and removed from the battery receptacle in a vertical direction.

4. The connector of claim 3, wherein the signal pin structure contact is inserted and removed in a horizontal direction.

5. The connector of claim 3, wherein the signal pin structure contact is inserted and removed in a vertical direction.

6. The connector of claim 1, wherein the battery connector is inserted and removed from the battery receptacle in a horizontal direction.

7. The connector of claim 6, wherein the signal pin structure contact is inserted and removed in a horizontal direction.

8. The connector of claim 6, wherein the signal pin structure contact is inserted and removed in a vertical direction.

9. An information handling system comprising:
   a connector including:
   a battery connector including a first plurality of power pins and a first plurality of signal pins;
   a battery receptacle including a second plurality of power pins and a second plurality of signal pins, the first and second power pins coupled together when the battery connector is inserted within the battery receptacle; and
   a signal pin structure contact to transition between an open position and a closed position, the signal pin structure contact to, when the battery connector is inserted within the battery receptacle, decouple the first and second signal pins when the signal pin structure contact is in the open position and couple the first and second signal pins when the signal pin structure contact is in the closed position, wherein a power down signal is provided to components of the information handling system when the signal pin structure contact is in the open position; and
   an embedded controller in communication with the first and second signal pins, the embedded controller to provide a power down signal to components of the information handling system when the signal pin structure contact is in the open position.

10. The information handling system of claim 9, the connector further including:
   a signal pin structure contact cover in physical communication with and located between the signal pin structure contact and the first and second signal pins.

11. The information handling system of claim 9, wherein the battery connector is inserted and removed from the battery receptacle in a vertical direction.

12. The information handling system of claim 11, wherein the signal pin structure contact is inserted and removed in a horizontal direction.

13. The information handling system of claim 11, wherein the signal pin structure contact is inserted and removed in a vertical direction.

14. The information handling system of claim 9, wherein the battery connector is inserted and removed from the battery receptacle in a horizontal direction.

15. The information handling system of claim 14, wherein the signal pin structure contact is inserted and removed in a horizontal direction.

16. The information handling system of claim 14, wherein the signal pin structure contact is inserted and removed in a vertical direction.

17. A method comprising:
   determining, by an embedded controller of an information handling system, whether a signal pin structure contact is in an open position or in a closed position, wherein the signal pin structure contact couples a first set of signal pins in a battery connector to a second set of signal pins in a battery receptacle in the information handling system;
   in response to the signal pin structure contact being in the closed position, providing a power up signal to components of the information handling system;
   in response to the signal pin structure contact being in the open position, providing a power down signal to the components; and
   wherein the determining of whether the signal pin structure contact is in the open position or in the closed position, the method further comprises:
   monitoring one of the first signal pins; and
   determining whether data is being communicated on the one of the first signal pins.

18. The method of claim 17, wherein the determining of whether the signal pin structure contact is in the open position or in the closed position, the method further comprises:
   monitoring a second pin of the first signal pins and a third pin of the first signal pins; and
   determining whether the second and third pins are set to the same value or to different values.

19. The method of claim 18, further comprising:
   in response to the second and third pins being set to different values, determining that the signal pin structure contact is in the open position.

* * * * *